Feb. 16, 1965     G. BERGSON     3,170,021
COLOR MEASURING DEVICE FOR PRINTING PRESSES
Filed April 22, 1959     2 Sheets-Sheet 1
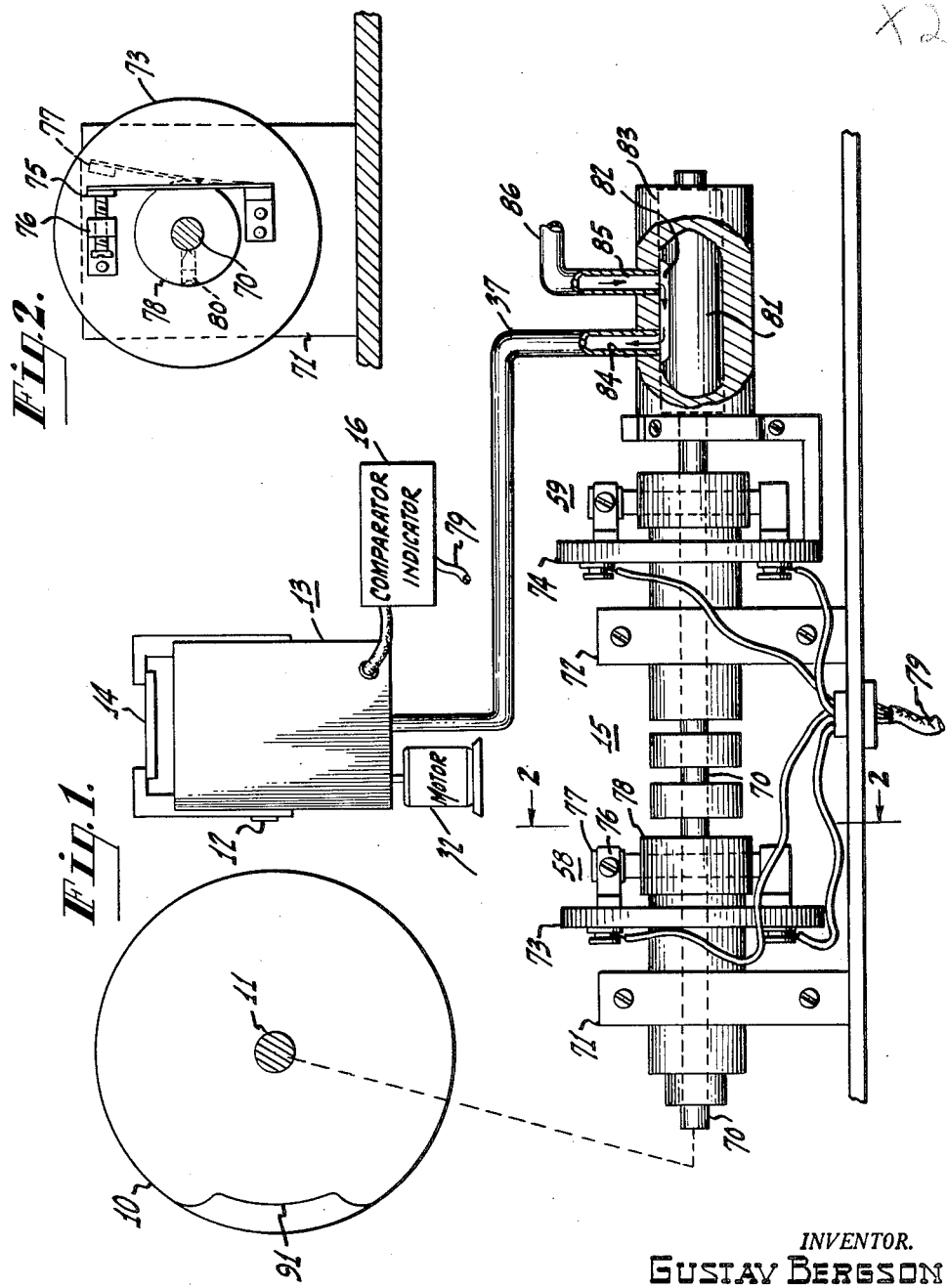
INVENTOR.
GUSTAV BERGSON
BY Eugene M. Whitacre
ATTORNEY

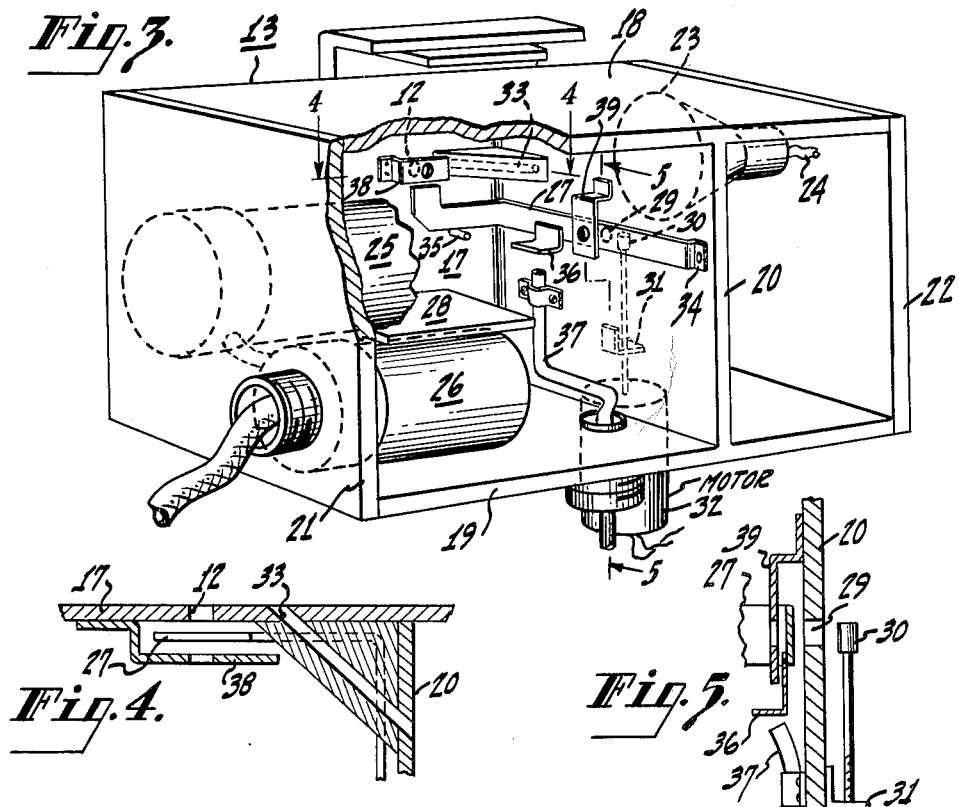

United States Patent Office 3,170,021
Patented Feb. 16, 1965

3,170,021
COLOR MEASURING DEVICE FOR
PRINTING PRESSES
Gustav Bergson, Jenkintown, Pa.
(York Road and Sunset Lane, Hatboro, Pa.)
Filed Apr. 22, 1959, Ser. No. 808,090
3 Claims. (Cl. 88—14)

This invention relates to systems for measuring the effects of a material on radiant energy, such as visible light to provide an indication of a particular characteristic of the material. More particularly, the invention relates to measuring systems of a type which is particularly well adapted for use with color printing presses to provide an indication of the uniformity of the color of the imprint on paper passing through the press.

In color printing, it is desirable that the individual colors applied by the press be maintained constant to provide uniformity of the copies produced. Changes in the printed colors may be caused by variations in the amount of ink applied to the press through the ink transfer mechanism, or in non-uniformities in the color of the ink used. Likewise, if the paper positioning or registering mechanism should fail to operate correctly, the colors on the printed copies will be blurred due to the failure of the colors to be properly superimposed with respect to one another. Such variations in the color imprinted may occur on presently used machines without the press operator knowing of the trouble until an inspection has been made of the printed material. This results in a considerable waste of time and material, since some time may elapse before the trouble is discovered. At other times, the failure may be intermittent, and the imperfectly printed sheets may be scattered throughout an otherwise correctly printed stack of papers. In this case, a cumbersome and expensive checking and sorting job is necessary through the thick stacks of printed sheets.

Accordingly, it is an object of the present invention to provide an improved measuring system which will provide an indication to the press operator of variances in the color imprinted by the press.

Another object of this invention is to provide an improved system for measuring the effects such as absorption or reflection of a material under test on radiant energy, such as visible light, for example, to provide an indication of a particular characteristic of the material.

A further object of this invention is to provide an improved automatic colorimeter which is simple and rugged in construction, and which provides efficient and reliable color measurements under a wide variety of operating conditions.

The measuring system of the invention includes a source of radiant energy such as a filamentary lamp for producing visible light. Radiant energy from the source is directed to a single detector, such as a phototube, alternately through one of two paths. The first path is direct to the detector and provides a reference for the system. In the second path the radiant energy is directed to the detector by way of the material under test. The detector thus produces time sequential signals respectively corresponding to the radiant energy incident thereon from the reference and measurement paths. The signals from the detector are applied through synchronously controlled switch means to the two input terminals of an electrical comparison and indicating circuit to provide an indication of the amount of radiant energy absorbed and/or reflected by the material under test. The switch means is controlled so that the output of the detector in response to radiant energy from the reference path is applied to one of the input terminals of the comparison circuit, and the output of the detector in response to radiant energy from the measurement path is applied to the other of the comparison circuit input terminals.

In color printing presses, the measuring apparatus of the invention is physically positioned so that a selected portion of the printed copies passes through the second path to reflect a certain amount of radiant energy to the detector. The amount of radiant energy reflected will be a function of the color imprinted on the copy. A feature of the invention resides in a shutter mechanism which is provided to control the two radiant energy paths. The shutter mechanism is synchronized with the printing press in a novel manner so that the measuring path is opened when the selected portion of a copy is in the proper position to reflect the radiant energy to the detector. As will be described hereinafter, the shutter synchronizing mechanism is pneumatically operated, and thereby avoids the use of components which produce electric and magnetic fields that might affect the operation of the radiant energy detector. The mechanism is of extremely simple construction and contributes substantially to the compactness of the measuring system.

It is accordingly a still further object of this invention to provide an improved shutter mechanism of extremely simple construction for color measuring systems of a type useful with printing presses, wherein the shutter mechanism is adapted to be operated in synchronism with the press by means of a pneumatic control.

The novel features that are considered to be characteristic of this invention are set forth with particularity in the appended claims. The invention itself, however, both as to its organization and method of operation, as well as additional objects and advantages thereof, will best be understood from the following description when read in connection with the accompanying drawings, in which:

FIGURE 1 is a diagrammatic representation of the measuring system of the invention as applied to a printing press, and showing in greater detail the mechanism for synchronizing the switching means and the shutter operation;

FIGURE 2 is a sectional view taken on the section lines 2—2 of FIGURE 1;

FIGURE 3 is a perspective view, partly broken away, of the optical portion of the measuring system shown in FIGURE 1;

FIGURE 4 is a sectional view taken on the section lines 4—4 of FIGURE 3;

FIGURE 5 is a sectional view taken on the section lines 5—5 of FIGURE 3; and

FIGURE 6 is a schematic circuit diagram showing the electrical connections in accordance with one embodiment of the invention.

With reference to the drawings and particularly to FIGURE 1, a color printing press is diagrammatically represented by the drum 10 which rotates on a shaft 11. Sheets of paper on which the desired copy has been imprinted are passed around the drum 10 past a viewing aperture 12 of the measuring apparatus housing 13. The housing 13 is supported from a member 14, and is longitudinally movable therealong to bring the aperture 12 opposite a desired portion of the printed copies passing through the press. Naturally, the pattern and even the colors imprinted on that portion of the copies passing the aperture 12 may vary. In order that an accurate measurement of a single color of a selected portion of the copy be obtained, a shutter mechanism is provided in the housing 13 which is synchronized with the rotation of the drum 10 so that the only radiant energy entering the housing 13, is reflected from the selected portion of the printed copy. The synchronization referred to is effected by the synchronizing mechanism 15 to be described in greater detail hereinafter. The detected signal output from the portion of the measuring apparatus contained in the housing 13 is applied to a comparison and indication circuit 16 which provides the press operator with a relative indication of the color imprinted by the press at the selected portion of the copy. If desired, the indicator may comprise an alarm, which is actuated by a predetermined departure of the imprinted color from that desired.

The portions of the measuring system enclosed within the housing 13 are best shown in the perspective view of FIGURE 3, which is viewed from the rear of the housing with the rear cover removed, and not shown. As shown in FIGURE 3, the casing 13 is comprised of a casting including the front wall 17, top and bottom walls 18 and 19, and a partition 20. The various electrical components are mounted on the two end plates 21 and 22, thereby contributing to the ease of the construction and assembly of the apparatus.

The housing 13 essentially includes two compartments. The compartment shown to the right of the partition 20 as viewed in FIGURE 3 contains the source of radiant energy, which in the present case, is a lamp 23 which is electrically energized from a suitable power source, not shown, through a cable 24 extending through the end plate 22 on which the lamp 23 is mounted. The compartment shown to the left of the partition 20 as viewed in FIGURE 3 includes a detector such as a phototube 25 which is shown partially broken away, an electrometer amplifier tube 26 therefor, and a pneumatically operated shutter 27. A light shield 28 which may comprise an integral portion of the casting, is provided between the phototube 25 and the electrometer amplifier tube 26 so that radiant energy from the filament of the electrometer amplifier does not produce spurious signal outputs from the phototube 20. The phototube 25 and electrometer amplifier tube 26 are mounted in suitable sockets supported on the end plate 21, and electrical connections thereto are made through a cable passing through the end plate.

Light from the lamp 23 can enter the phototube 25 chamber through either of two paths, depending on the position of the shutter 27. The first path best shown in FIGURE 5 is a reference path through an aperture 29 in the partition 20. The amount of light which may pass through the aperture 29 is controlled by a light blocking member 30 which is threadedly supported in a bracket 31. The position of the light blocking member 30 is controlled by a reversible motor 32 which may be remotely controlled to rotate the member 30 toward or away from the aperture 29. In the second or measuring path, best shown in FIGURE 4, the light is directed from the source 23 through a channel 33 which terminates adjacent the viewing aperture 12. The light emanating from the channel 33 is reflected from the printed copy and back to the phototube chamber through the aperture 12. The phototube 25 is positioned so that light entering the compartment through either of the apertures 29 or 12 impinges on the phototube.

As shown in the drawing, the shutter 27 is in a position to permit light to pass through the measuring path but to block the reference path. The shutter is pivotally mounted on a stud 34 and is biased by force of gravity to a first lower position limited by a pin 35. In the position shown, the main body of the shutter passes over the aperture 29 in the partition 20, and the free end thereof is positioned adjacent, but does not cover the aperture 12 in the front wall 17 of the housing 13. Affixed to the shutter 27 intermediate its ends is a vane 36 which is positioned opposite the free end of a tube 37 which extends externally of the housing 13 to the synchronizing mechanism 15. When air is forced through the tube 37 and directed against the vane 36, the shutter 27 moves to its alternate position wherein light is admitted to the phototube 25 chamber directly through the aperture 29, but the measuring path including the aperture 12 is blocked. The pneumatically operated shutter has the advantage of not producing electrical or magnetic disturbances which might adversely affect the phototube 25 operation.

In order to minimize light leakage around the shutter 27, light shields 38 and 39 are provided over the apertures 12 and 29, respectively. The light shields 38 and 39 include apertures which are positioned for registry with the apertures 12 and 29 respectively. It is preferable that the interior of the phototube 25 chamber be painted black or otherwise coated with a light absorbing material, to minimize the reflections of undesired light which may enter the chamber.

An illustrative schematic circuit diagram for the phototube 25 and electrometer amplifier tube 26 shown in FIGURE 3 and the comparator and indicator 16 of FIGURE 1 is shown in FIGURE 6. The anode of the phototube 25 is connected with the positive terminal of a polarizing potential supply source, not shown. The supply source also includes a negative terminal, and has an intermediate portion connected to ground. The cathode of the phototube 25 is connected to the negative terminal of one supply source through a load resistor network including a fixed resistor 50, an adjustable resistor 51, and a second adjustable resistor 51'. Signals developed across the load resistors 50 and 51 are applied to the control grid of the electrometer tube 26, the anode of which is connected to the positive terminal of the supply source through a resistor 52. The signals applied to the tube 26 are translated therethrough and developed across a load resistor 53 connected between the cathode and ground. The developed signals are then applied through a pair of resistors 54 and 55 to the comparator and indicator circuits 16.

The comparator and indicator circuits include a pair of double pole-double throw switches 56 and 57 which are in the position shown during the normal operation of the measuring circuit of the invention. A pair of switches 58 and 59, the actuation of which are controlled by the synchronizing mechanism 15 of FIGURE 1, are connected in series respectively with the resistors 54 and 55. When the switch 58 is closed, the signals translated through the electrometer tube 26 are applied to a resistance-capacitance network 60 connected to the control grid of an amplifier tube 61. Likewise, when the switch 59 is closed, the signals appearing across the resistor 53 are applied to the resistance-capacitance network 62 which is connected to the control grid of an amplifier tube 63. The anodes of the tubes 61 and 63 are connected respectively through resistors 64 and 65 to opposite ends of a resistor 66, and from an adjustable tap on the resistor 66 to the positive terminal of the potential supply source. The cathodes of the amplifier tubes 61 and 63 are connected to ground through the resistors 67 and 68 respectively. An indicator 69 which is preferably a meter, but may comprise any form of indicator, such as an alarm or the like, is connected between the cathodes of the tubes 61 and 63. The indicator may, if desired, include suitable range adjusting resistive shunts connected in a suitable manner to indicate response in terms of a desired percentage of reflectance.

Before describing the operation of the measuring system of the invention, reference is made to the synchronizing mechanism 15 shown in FIGURE 1. The synchronizing mechanism 15 includes a shaft 70 which is journaled for rotation in the bearings 71 and 72 and which is mechanically coupled to the shaft 11 of the printing press drum 10. Affixed to one end of the bearings 71 and 72 are insulating supports 73 and 74 which support the switches 58 and 59 (also shown in FIGURE 6). The construction of the switch 58 which is substantially identical to that of the switch 59 is shown in FIGURE 2. The switch 58 includes a stationary contact 75 supported in a bracket 76, and a movable contact 77 which rides on the surface of a cam 78 that rotates with the shaft 70. When the flat part of the cam 78 is against the armature of the movable contact 77, the contacts of the switch are closed. Conductors from the contacts on the switches 58 and 59 are connected to the comparator and indicator 16 through the cable 79. The position of the flat part of the cam relative to the shaft 70 may be adjusted by loosening the set screw 80 and rotating the cam 78 to the desired position before tightening the set screw.

The right hand end of the shaft 70 as viewed in FIGURE 1 is provided with a sleeve 81 having a longitudinally extending cut-out portion 82. The shaft 70 and sleeve 81 rotate in a stationary housing 83 which has a pair of spaced radially extending ports 84 and 85. A tube 86 extends from the port 85 to a source of compressed air, not shown, and the tube 37 previously mentioned in connection with FIGURE 3 extends from the port 84 to the housing 13. Thus, air will flow through the tubes 37 and 86 once for each revolution of the shaft 70, when the longitudinal cut-out portion of the sleeve 81 is aligned with the ports 84 and 85.

To measure or monitor the color imprinted by the press, the housing 13 is moved along the member 14 until the viewing aperture 12 in the front wall 17 of the housing is in line with a selected portion of the printed material. The drum is then rotated until the selected portion of the printed material is directly opposite the aperture 12. The switch 56, FIGURE 6, is then thrown to the "set" position thereby connecting an indicator lamp 90 and a source of energizing current therefor in series with switch 58 on the insulating support 73. The set screw 80 is then loosened and the cam 78 is turned on the shaft 70 until the contacts of the switch 58 close as will be indicated by the illumination of the indicator lamp 90 and the set screw is tightened.

The drum 10 is rotated until the indented portion 91 thereof which is not covered by the printed material is opposite the aperture 12. At this point the relative positions of the sleeve 81 and housing 83 are adjusted so that compressed air flows through the tube 37 and is directed against the vane 36 so that the shutter is moved to its alternate position, whereby light is admitted to the phototube chamber through the aperture 29 in the partition 20. The switch 57 is then thrown to the "set" position whereby an indicator lamp 92 and a source of energizing current therefor are connected in series with the switch 59 on the insulating support 74. The cam controlling the switch 59 is then adjusted relative to the shaft 70 until the switch contacts close as indicated by the lamp 92. Once the initial adjustments of the switch 59 and pneumatic operation have been made, further adjustment when measuring different printed material on the same press are ordinarily not required.

With the switches 56 and 57 in the "set" position, the tap on the resistor 66 is adjusted to provide the desired relative outputs from the amplifier tubes 61 and 63. It is generally desirable that the two stages be balanced, and accordingly, the tap on the resistor 66 is adjusted until the cathodes of the two tubes are at the same potential. The switches 56 and 57 are then thrown to the "operate" position, and the press is put into operation.

As the printed copies pass by the viewing aperture 12, light directed through the channel 33 is reflected therefrom back through the open aperture 12 to the phototube 25. The signal output of the phototube varies with the amount of light reflected thereto, however, this output is not applied to the comparator circuit since the switch 58 is open. When the selected portion of the printed material is in a position to reflect light to the phototube 25, the cam 78 causes the switch 58 to close. Thus, the signal output of the phototube at that time, as translated by the electrometer tube 26, is applied to the resistance-capacitance network 60. The charging circuit time constant is very short, permitting the capacitive portion of the network to quickly charge to substantially the full output voltage. However, the discharge time constant of the network is quite long so that a substantial portion of the charging voltage is maintained at the grid of the tube between successive charging cycles.

When the drum 10 of the printing press has rotated far enough so that the indented portion 91 thereof is opposite the aperture 12, air flows from the compressed air source through the tube 86, the cut-out portion 82 of the sleeve 81 and the tube 37 to operate the shutter 27. As explained above, the shutter then moves to cover the aperture 12, and permit light to enter the phototube chamber through the aperture 29. After the shutter uncovers the aperture 29, a cam on the shaft 70 closes the switch 59 to apply the resultant signals to the resistance-capacitance network 62. The network 62 has a fast charge time and slow discharge time constant, and operates in a manner similar to that described above with respect to the network 60.

Broadly, where a meter indicates the differential output voltages as measured at the cathodes of the tubes 61 and 63, the reading may be noted when the color imprinted by the press is that desired, and any departure therefrom indicates a change in color. This is because different colors will absorb different amounts of light incident thereon.

To provide a more precise calibration of the measuring system, a black light absorbent sample is placed before the viewing port 12, and the electrometer tube 26 cathode voltage is noted. A calibrated sample having a known reflectance is then placed before the viewing port 12. The variable resistor 51 which is calibrated to read in terms of percentage reflectance is then set to indicate the reflectance of the sample. With the calibrated sample aligned with the viewing port, the resistor 51' is adjusted so that the cathode voltage of the electrometer is the same as it was with the black sample.

The press is then set into operation and a printed copy is selected for comparison with a sample having a reflectance of the value which is to be printed. The comparison may be effected in a standard colorimeter, and may indicate that the reflectance of the imprinted material is a given percent too high or too low. Thus, with the press in operation, the motor 32 is energized to adjust the light blocking member 30 to admit more or less light to the phototube chamber when the shutter 27 is in the reference position. The light blocking member is adjusted to a position where the indicated meter reading corresponds to the percentage variation of the printed copy from the sample as determined by the aforesaid comparison. The press is then ready for operation. It should be noted that motor control of the light blocking member 30 is desirable, since it may be necessary to locate the housing 13 in an inaccessible location on the press.

What is claimed is:

1. A color measuring device for printing presses comprising, means providing a housing including walls defining first and second closed compartments separated by a partition, means providing a source of radiant energy in said first compartment, means providing a radiant energy detector in said second compartment, means defining a first aperture in an exterior wall of said housing communicating with said first compartment through which radiant energy from said source may be directed to a sample of a material under test, means defining a second aperture in an exterior wall of said housing communicating with said second compartment for admitting at least a portion of the radiant energy directed through said first aperture and reflected from a sample of a material under test, means defining a third aperture in said partition communicating between said first and second compartments, said radiant energy detector being positioned in said second compartment so that radiant energy entering said second compartment through said second and third apertures impinges on said detector, said housing adapted to be positioned with respect to said printing press such that copies of the material printed by said press pass by said first and second apertures so that radiant energy emanating from said first aperture is reflected from said material into said second aperture, a shutter member for blocking said third aperture in a first position thereof and for blocking at least one of said first and second apertures in a second position thereof, means providing a vane on said shutter member, a conduit through which air is passed positioned to direct air against said vane to move said shutter member from said first position to said second position, means for blocking said conduit in synchronism with the movement of said press, and means for comparing the response of said detector when said shutter means is in the first position thereof with the response when said shutter means is in the second position thereof.

2. A color measuring device for rotary printing presses comprising means providing a housing including walls defining first and second closed compartments separated by a partition, means providing a source of radiant energy in said first compartment, means providing a radiant energy detector in said second compartment, means defining a first aperture in an exterior wall of said housing communicating with said first compartment through which radiant energy from said source may be directed to a sample of a material under test, means defining a second aperture in an exterior wall of said housing communicating with said second compartment for admitting at least a portion of the radiant energy directed through said first aperture and reflected from a sample of a material under test, means defining a third aperture in said partition communicating between said first and second compartments said radiant energy detector being positioned in said second compartment so that radiant energy entering said second compartment through said second and third apertures impinges on said detector, said housing adapted to be positioned with respect to said printing press such that copies of the material printed by said press pass by said first and second apertures so that radiant energy emanating from said first aperture is reflected from said material into said second aperture, a shutter member for blocking said third aperture in a first position thereof and for blocking at least one of said first and second apertures in a second position thereof, means providing a vane on said shutter member, a conduit through which air is passed positioned to direct air against said vane to move said shutter member from said first position to said second position, a shaft having a longitudinally extending slot coupled for rotation with said printing press, means providing a member in which said shaft is journaled, and a pair of spaced longitudinally aligned-radially extending ports in said last named member, one of which is connected to said conduit and the other of which is adapted to be connected with a compressed air source so that when said longitudinally extending slot is aligned with said ports, air passes through said conduit to move said shutter from said first position to said second position in synchronism with the rotation of said press, and means for comparing the response of said detector when said shutter means is in the first position thereof with the response when said shutter means is in the second position thereof.

3. A measuring system for use with color printing presses to provide an indication of the relative color imprinted by the press, comprising means providing a housing including walls defining first and second closed compartments separated by a partition, means providing a light source in said first compartment, means providing a light detector in said second compartment, means defining a first aperture in an exterior wall of said housing communicating with said first compartment through which light from said source is directed, means defining a second aperture in an exterior wall of said housing communicating with said second compartment for admitting light into said second compartment, means defining a third aperture in said partition communicating between said first and second compartments said light detector being positioned in said second compartment so that light entering said second compartment through said second and third apertures impinges on said detector, said housing adapted to be positioned relative to printed copies moving in said press that a portion of each copy imprinted with the color to be measured moves through a path such that light from said source directed through said first aperture is reflected from said portion back through said second aperture into said second compartment, a shutter member pivotally mounted in said second compartment biased to a first position to block said third aperture and pivotally movable to a second position to block said second aperture, means providing a vane on said shutter member, a conduit through which air is passed positioned to direct air against said vane to move said shutter member from said first position to said second position, a shaft having a longitudinally extending slot coupled for rotation with said printing press, means providing a member in which said shaft is journaled, and a pair of spaced longitudinally aligned-radially extending ports in said last named member, one of which is connected to said conduit and the other of which is adapted to be connected with a compressed air source so that when said longitudinally extending slot is aligned with said ports, air passes through said conduit to move said shutter from said first position to said second position in synchronism with the rotation of said press so that said shutter means is in the first position thereof when said portion of each copy is in a position to reflect light from said source through said second aperture, and means for comparing the response of said detector when energized by light entering said second compartment through said second aperture with the response thereof when energized by light entering said second compartment through said third aperture.

References Cited by the Examiner
UNITED STATES PATENTS

| | | | |
|---|---|---|---|
| 1,525,548 | 2/25 | Jenkins | 88—61 |
| 2,546,450 | 3/51 | Hunter | 88—14 |
| 2,623,432 | 12/52 | Lange | 88—14 |
| 2,678,581 | 5/54 | Reisner | 88—14 |
| 2,766,095 | 10/56 | Molyneux et al. | 88—14 X |
| 2,795,170 | 6/57 | Hansen et al. | 88—61 |
| 2,969,016 | 1/61 | Crosfield et al. | 88—14 X |

JEWELL H. PEDERSEN, *Primary Examiner.*

EMIL G. ANDERSON, J. E. COINER, *Examiners.*